(12) United States Patent
Tall et al.

(10) Patent No.: US 10,710,272 B2
(45) Date of Patent: Jul. 14, 2020

(54) HYBRID MATERIAL AIRFLOW IMPRESSION MOLDS

(71) Applicant: United Technologies Corporation, Farmington, CT (US)

(72) Inventors: Mary Lynn Tall, Rocky Hill, CT (US); Matthew A. Mertens, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 295 days.

(21) Appl. No.: 15/842,186

(22) Filed: Dec. 14, 2017

(65) Prior Publication Data

US 2019/0184600 A1 Jun. 20, 2019

(51) Int. Cl.
*B28B 7/34* (2006.01)
*B28B 7/00* (2006.01)
(Continued)

(52) U.S. Cl.
CPC ............ *B28B 7/346* (2013.01); *B28B 7/0008* (2013.01); *B28B 7/0011* (2013.01); *B28B 7/348* (2013.01); *B29C 64/10* (2017.08); *F01D 21/003* (2013.01); *G01M 13/00* (2013.01); *B28B 7/18* (2013.01); *B33Y 10/00* (2014.12); *B33Y 80/00* (2014.12); *F05D 2240/80* (2013.01)

(58) Field of Classification Search
CPC ........... B28B 7/18; B28B 7/346; B28B 7/348; B28B 7/0008; B28B 7/0011; B29C 64/10
See application file for complete search history.

(56) References Cited

U.S. PATENT DOCUMENTS 3,219,307 A * 11/1965 Leeds .................... B28B 7/346
425/388
5,178,003 A * 1/1993 Wesorick ................ G01L 3/247
73/112.01
(Continued)

FOREIGN PATENT DOCUMENTS

CN 103481219 A * 1/2014
CN 203752004 U * 8/2014
(Continued)

OTHER PUBLICATIONS

CN103481219A, english translation of document from google patents, 11 pages. (Year: 2020).*
(Continued)

*Primary Examiner* — Xiao S Zhao
*Assistant Examiner* — Emmanuel S Luk
(74) *Attorney, Agent, or Firm* — Kinney & Lange, P.A.

(57) ABSTRACT

A monolithic airflow testing mold suitable for mating with a workpiece includes a platform portion formed from a first material having a first hardness. The mold further includes a workpiece mating portion surrounding by the platform portion. The mating portion includes a support region abutting the platform portion and formed from a second material having a second hardness, and a sealing surface positioned above the support region and formed from a third material having a third hardness. The sealing surface is configured to mate with and extend into a hollow portion of the workpiece. The first hardness is different from at least one of the second and third hardnesses.

19 Claims, 3 Drawing Sheets

(51) Int. Cl.
    *B29C 64/10*     (2017.01)
    *G01M 13/00*     (2019.01)
    *F01D 21/00*     (2006.01)
    *B33Y 10/00*     (2015.01)
    *B33Y 80/00*     (2015.01)
    *B28B 7/18*     (2006.01)

(56) References Cited

U.S. PATENT DOCUMENTS

| | | | |
|---|---|---|---|
| 5,984,256 A * | 11/1999 | Endo | B28B 1/525 |
| | | | 249/114.1 |
| 6,772,627 B2 * | 8/2004 | Fleming | G01M 9/04 |
| | | | 73/147 |
| 6,857,325 B2 * | 2/2005 | Sato | F01D 5/18 |
| | | | 415/115 |
| 7,024,929 B2 * | 4/2006 | Fleming | G01M 9/04 |
| | | | 73/147 |
| 7,685,870 B2 * | 3/2010 | Quinn | F01D 25/285 |
| | | | 73/112.01 |
| 8,104,953 B2 | 1/2012 | Van Suetendael et al. | |
| 8,438,915 B2 * | 5/2013 | McCall | G01M 15/14 |
| | | | 73/112.01 |
| 8,534,122 B2 * | 9/2013 | Mironets | F01D 21/003 |
| | | | 73/112.01 |
| 8,806,924 B2 * | 8/2014 | Bregier | G01M 15/14 |
| | | | 73/112.01 |
| 9,731,349 B2 | 8/2017 | Campomanes et al. | |
| 9,925,876 B2 * | 3/2018 | Tall | B60L 1/00 |
| 10,173,264 B2 * | 1/2019 | Propheter-Hinckley | |
| | | | B22F 3/1055 |
| 2004/0221659 A1 | 11/2004 | Sato | |
| 2013/0026365 A1 | 1/2013 | Jahnke et al. | |
| 2013/0047714 A1 | 2/2013 | McCall et al. | |
| 2015/0069647 A1 * | 3/2015 | Ciuperca | B28B 7/263 |
| | | | 264/31 |
| 2016/0023375 A1 | 1/2016 | Uram | |
| 2017/0045392 A1 * | 2/2017 | Tall | B60L 1/00 |
| 2017/0197332 A1 * | 7/2017 | Eum | B28B 7/38 |
| 2017/0361490 A1 * | 12/2017 | Herny | B28B 1/001 |
| 2019/0091894 A1 * | 3/2019 | Ruttico | B29C 33/3878 |
| 2019/0232497 A1 * | 8/2019 | Tall | B25J 9/1697 |

FOREIGN PATENT DOCUMENTS

| | | |
|---|---|---|
| CN | 104849014 A | 8/2015 |
| CN | 105269494 A | 1/2016 |

OTHER PUBLICATIONS

CN104849014A, english translation of document from google patents, 8 pages. (Year: 2020).*
CN105269494A, english translation of document from google patents, 8 pages. (Year: 2020).*
CN203752004U, english translation of document from google patents, 6 pages. (Year: 2020).*
Extended European Search Report for EP Application No. 18212086.5, dated Apr. 24, 2019, 7 pages.

* cited by examiner

HYBRID MATERIAL AIRFLOW IMPRESSION MOLDS

BACKGROUND

Many aerospace components include air channels (e.g., for cooling) that are fabricated to strict specifications and tested during manufacture to ensure that fluid flow and differential pressure across these channels fall within expected ranges. Part-specific sealing molds are used throughout the airflow testing process to cover and restrict airflow through the air channels. Current molds can be a cast rubber formed around a scrap component to obtain the desired geometry. Further features can be added by cutting away the material. Mold making can be a time-consuming process, and the molds are prone to leaking if improperly cast or cut.

SUMMARY

A monolithic airflow testing mold suitable for mating with a workpiece includes a platform portion formed from a first material having a first hardness. The mold further includes a workpiece mating portion surrounding by the platform portion. The mating portion includes a support region abutting the platform portion and formed from a second material having a second hardness, and a sealing surface positioned above the support region and formed from a third material having a third hardness. The sealing surface is configured to mate with and extend into a hollow portion of the workpiece. The first hardness is different from at least one of the second and third hardnesses.

A method of fabricating a monolithic airflow testing mold suitable for mating with a workpiece includes depositing a first material having a first hardness onto a build substrate to form a platform portion, depositing a second material having a second hardness within the platform portion to form a workpiece mating portion, and depositing a third material having a third hardness onto the mating portion to form a sealing surface. The first hardness is different from at least one of the second and third hardnesses.

DETAILED DESCRIPTION

The present invention is directed to hybrid molds for use in aerospace component airflow testing. The molds are formed using an additive manufacturing process, and include regions of varied hardness. Harder regions can be formed in areas requiring greater structural support, while softer regions can be formed where some deformability is desired, such as at mating surfaces. The additively manufactured molds can be produced in less time than prior molds, and have improved structural and sealing properties.

Figure 1:
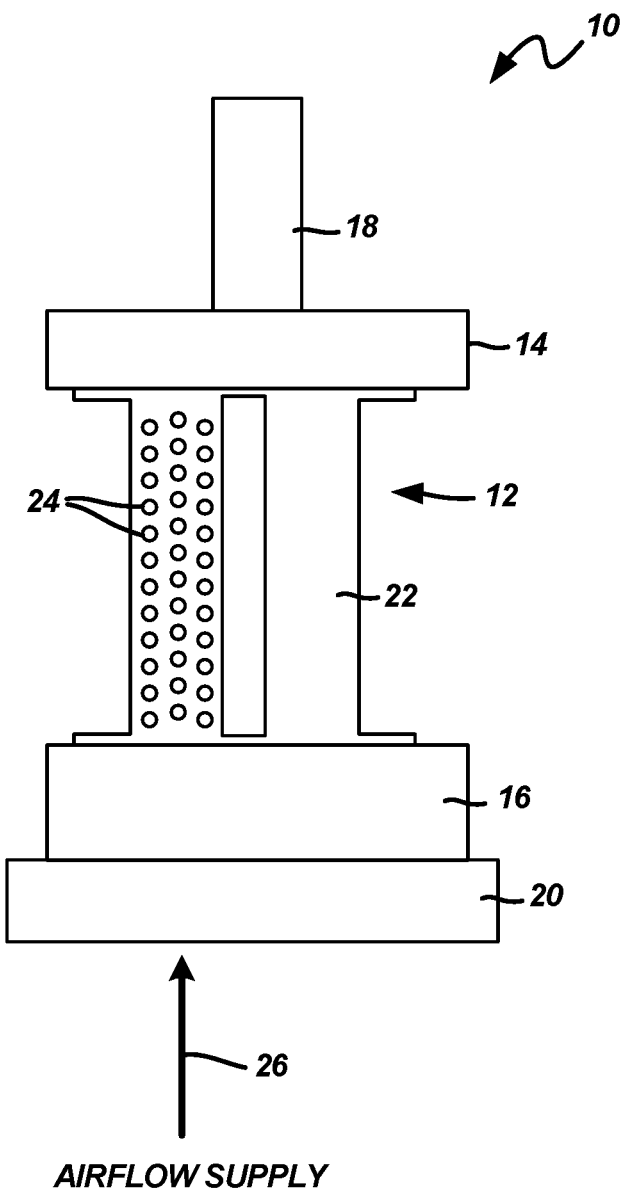
FIG. 1 is a simplified view of an airflow testing assembly.

FIG. 1 is a simplified view of airflow testing assembly 10. Assembly 10 includes workpiece 12, inner sealing mold 14, and outer sealing mold 16. Assembly 10 further includes clamp 18 and base 20. Workpiece 12 includes a body 22 with orifices 24. In the embodiment shown, workpiece 12 is a hollow vane. In other embodiments, however, workpiece 12 can be a blade, or other aerospace component having fluid channels or passages. In operation, clamp 18 and base 20 support and hold together workpiece 12 and molds 14 and 16 while airflow supply 26 is injected through outer sealing mold 16 and into an airflow passage or passages within body 22.

Figure 2:
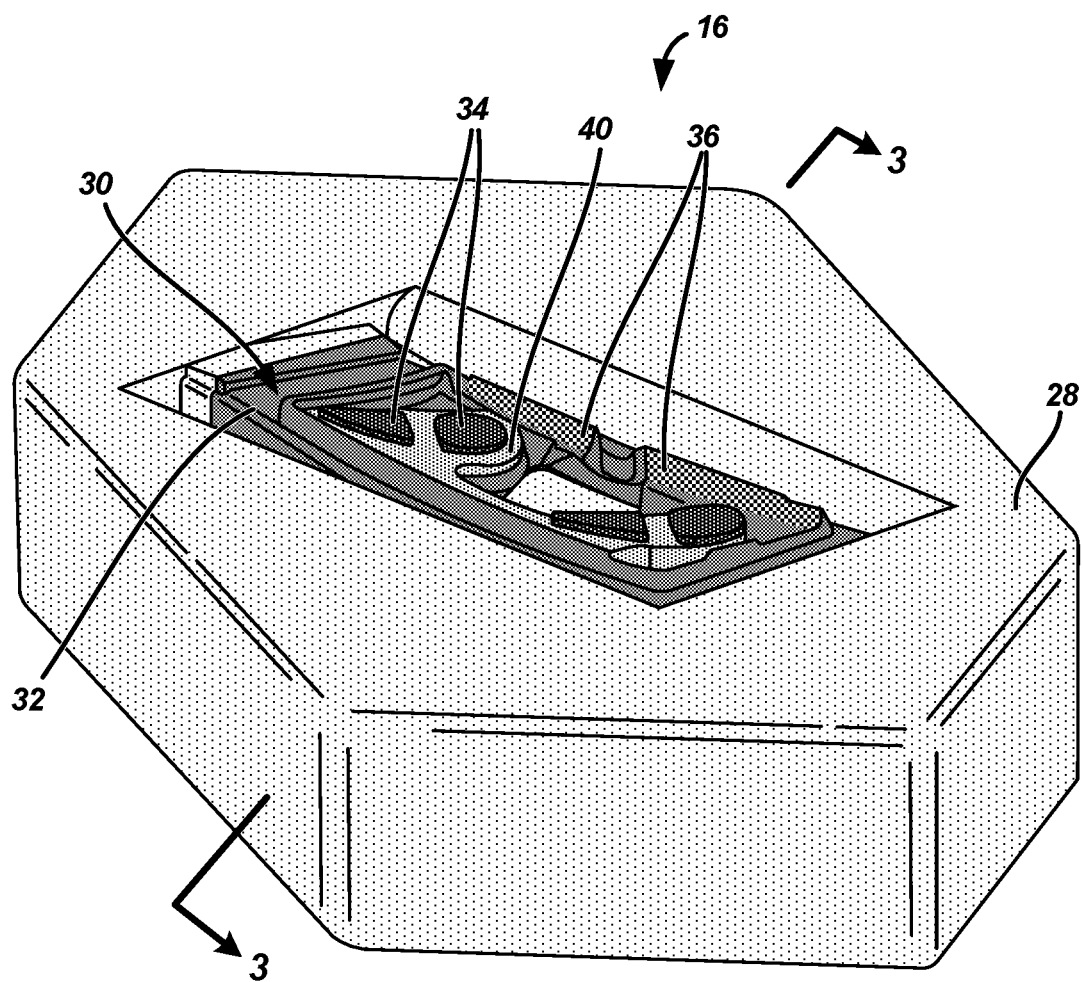
FIG. 2 is a perspective view of an airflow mold belonging to the testing assembly of FIG. 1.
Figure 3:
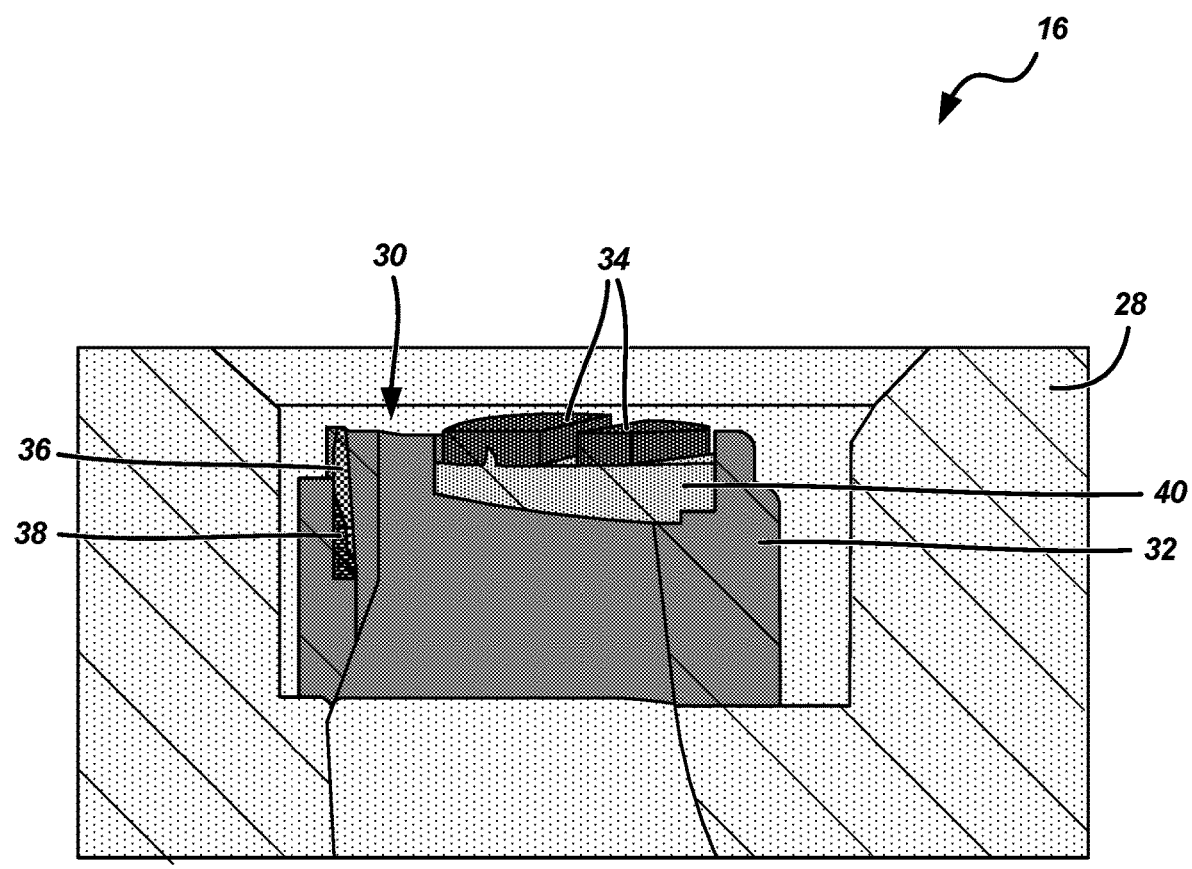
FIG. 3 is a cross-sectional view of the airflow mold of FIG. 2.

FIG. 2 is a perspective view of outer sealing mold 16, and FIG. 3 is a cross-sectional view of outer sealing mold 16 taken along line 3-3 of FIG. 2. Although FIGS. 2 and 3 illustrate outer sealing mold 16, it should be noted that inner sealing mold 14 can be formed in a substantially similar manner. As can be seen in FIGS. 2 and 3, mold 16 is a three-dimensional structure that includes a platform portion 28 surrounding workpiece mating portion 30. Mating portion 30 is complementary to the outer surface of workpiece 12 to which it is sealingly engaged in assembly 10. Mold 16 can be formed to include regions of varied hardness. For example, platform portion 28 can be substantially formed from a material having a first hardness, while mating portion 30 can be formed to include one or more structures having hardnesses different than the first hardness.

In the embodiment shown in FIGS. 2 and 3, platform portion 28 can have a Shore A durometer hardness of about 85. Mating portion 30 can include support region 32, which abuts platform portion 28 and supports other structures of mating portion 30. Support region 32 can be softer than platform portion 28 such that it has a Shore A durometer hardness of about 70. Mating portion 30 can further include one or more sealing surfaces 34. Sealing surfaces 34 are positioned above support region 32, and are designed to mate with and seal hollow portions of workpiece 12. In the embodiment shown in FIGS. 2 and 3, sealing surfaces 34 are specifically designed to extend into and seal internal airflow passages within body 22 of workpiece/vane 12. Sealing surfaces 34 can be softer than platform portion 28 and support region 32, such that they have a Shore A durometer hardness of about 60.

Mating portion 30 can further include one or more rigid support strips 36 disposed along its outer edge. Strips 36 can be harder than platform portion 28 such that they are formed from a material rated on the Shore D durometer scale. Strips 36 can physically contact and support workpiece 12 when mold 16 is a part of assembly 10, and can further help prevent a collapse of the edge of mating portion 30. Compressive region 38 (shown in FIG. 3), formed from a Shore A 60 material similar to that used for sealing surfaces 34, can be positioned underneath strips 36 in order to provide some "give" around the rigid material to facilitate sealing between mating portion 30 and workpiece 12. In other embodiments, strips 36 and/or compressive region 38 can be embedded or woven into other areas of mating portion 30, or integrated into internal passages designed to receive airflow supply 26.

In some embodiments, mating portion 30 can also include hard stop portions 40, formed from a Shore A 85 material, positioned between support region 32 and sealing surfaces 34. Hard stop portions 40 can be used to ensure proper alignment of workpiece 12, as well as provide additional support to sealing surfaces 34.

Harder regions of mold 16, such as platform portion 28 and support strips 36, can generally be formed where more structural support is needed and/or deformation is not desired. For example, platform portion 28 is relatively hard because it surrounds mating portion 30 and should be somewhat rigid to maintain the overall shape of mold 16. Conversely, deformation is more desirable within mating portion 30 because softer materials form better seals with workpiece 12, and can better accommodate the various external geometries of workpiece 12 due to the presence of welds, plates, or trunnion tubes.

Molds 14 and 16 can be formed using an additive manufacturing process. For example, molds 14 and 16 can be formed using a 3D printing technique, such as a material extrusion process. First, desired design parameters (e.g. complementary workpiece geometry, airflow regions, etc.) can be used to prepare a computer aided design (CAD) file. The 3D printer then uses the file to build the hybrid mold in a layer-by-layer fashion onto a build substrate. The disclosed molds can be formed from one or more polymer-based thermoplastics. Suitable thermoplastics can include acrylonitrile butadiene styrene (ABS), polycarbonates, acrylonitrile styrene acrylate (ASA), or nylons, to name a few, non-limiting examples. The various hardnesses can be achieved by altering the combination of materials used to create a mixture, and/or by altering the composition of materials within the mixture.

Assembly 10 can alternatively or additionally include other molds. For example, molds can be mated with the leading and trailing edges of body portion 22 to cover orifices 24. The disclosed molds can include regions having different relative or absolute hardnesses than those discussed above. For example, the first hardness can be less than the second and/or third hardnesses in some embodiments. It is also possible for any of the disclosed molds to be formed having only one or two materials of varied hardness, depending on the workpiece and airflow testing parameters. Finally, the disclosed additive manufacturing method can be used to form molds for blade outer air seals, combustor heat shields, thrust augmentors, and more.

The disclosed molds have many benefits. Each type of mold can be customized to mate with a specific workpiece surface. The regions of varied hardnesses collectively allow for better sealing between the workpiece and the mold, and also prevent excessive deformation or collapse of the mold during airflow testing. Forming the molds using a 3D printing technique allows for the targeted placement of the different regions, and also produces a mold having a more precise final geometry than previous methods. The use of 3D printing also allows for the simultaneous fabrication of molds used for testing both the in-process and final versions of a workpiece. This can reduce a workpiece production timeline by a number of weeks.

Discussion of Possible Embodiments

The following are non-exclusive descriptions of possible embodiments of the present invention.

A monolithic airflow testing mold suitable for mating with a workpiece includes a platform portion formed from a first material having a first hardness. The mold further includes a workpiece mating portion surrounding by the platform portion. The mating portion includes a support region abutting the platform portion and formed from a second material having a second hardness, and a sealing surface positioned above the support region and formed from a third material having a third hardness. The sealing surface is configured to mate with and extend into a hollow portion of the workpiece. The first hardness is different from at least one of the second and third hardnesses.

The mold of the preceding paragraph can optionally include, additionally and/or alternatively, any one or more of the following features, configurations and/or additional components:

In the above mold, the mating portion can complement a workpiece geometry.

In any of the above molds, the workpiece can be an airfoil.

In any of the above molds, the hollow portion of the workpiece can be an internal airflow passage.

In any of the above molds, the first hardness can differ from at least one of the second and third hardnesses by at least 10 Shore A points.

In any of the above molds, the first hardness can be greater than at least one of the second and third hardnesses.

In any of the above molds, the second hardness can be greater than the third hardness.

Any of the above molds can further include a fourth material having a fourth hardness and located within the mating portion.

In any of the above molds, the fourth hardness can be greater than the first hardness.

In any of the above molds, the fourth hardness can be less than the first hardness.

Any of the above molds can be formed from a polymer-based thermoplastic.

In any of the above molds, the polymer-based thermoplastic can be formed from a material selected from the group consisting of acrylonitrile butadiene styrene, polycarbonates, acrylonitrile styrene acrylate, nylons, and combinations thereof.

A method of fabricating a monolithic airflow testing mold suitable for mating with a workpiece includes depositing a first material having a first hardness onto a build substrate to form a platform portion, depositing a second material having a second hardness within the platform portion to form a workpiece mating portion, and depositing a third material having a third hardness onto the mating portion to form a sealing surface. The first hardness is different from at least one of the second and third hardnesses.

The method of the preceding paragraph can optionally include, additionally and/or alternatively, any one or more of the following features, configurations and/or additional components:

The above method can further include depositing a fourth material having a fourth hardness within the mating portion.

In any of the above methods, the fourth hardness can be greater than the first hardness.

In any of the above methods, the first through fourth materials can be formed from a polymer-based thermoplastic.

In any of the above methods, the polymer-based thermoplastic can be formed from a material selected from the group consisting of acrylonitrile butadiene styrene, polycarbonates, acrylonitrile styrene acrylate, nylons, and combinations thereof.

In any of the above methods, the first hardness can be greater than at least one of the second and third hardnesses.

In any of the above methods, the depositing steps can be carried out using an additive manufacturing process.

Any of the above methods can further include shaping the mating portion to complement a workpiece geometry.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A monolithic airflow testing mold suitable for mating with a workpiece, the airflow testing mold comprising:
   a platform portion formed from a first material having a first Shore A hardness; and
   a workpiece mating portion nested within and surrounded by the platform portion, the mating portion comprising:
      a support region abutting the platform portion and formed from a second material having a second Shore A hardness; and
      a sealing surface positioned above the support region and formed from a third material having a third Shore A hardness, the sealing surface being configured to mate with and extend into a hollow portion of the workpiece;
   wherein the first Shore A hardness is greater than at least one of the second and third Shore A hardnesses by at least 10 Shore A points.

2. The mold of claim 1, wherein the mating portion complements a geometry of the workpiece.

3. The mold of claim 1, wherein the workpiece is an airfoil.

4. The mold of claim 3, wherein the hollow portion of the workpiece is an internal airflow passage.

5. The mold of claim 1, wherein the second Shore A hardness is greater than the third Shore A hardness.

6. The mold of claim 1 and further comprising: a fourth material having a fourth Shore D hardness and located within the mating portion.

7. The mold of claim 6, wherein the fourth Shore D hardness is greater than the first Shore A hardness.

8. The mold of claim 1, wherein the mold is formed from a polymer-based thermoplastic.

9. The mold of claim 8, wherein the polymer-based thermoplastic is formed from a material selected from the group consisting of acrylonitrile butadiene styrene, polycarbonates, acrylonitrile styrene acrylate, nylons, and combinations thereof.

10. The mold of claim 1 and further comprising: a fourth material having a fourth Shore A hardness and located within the mating portion.

11. The mold of claim 10, wherein the fourth Shore A hardness is less than the first Shore A hardness.

12. The mold of claim 1 and further comprising: a fourth material having a fourth Shore A hardness and located between the support region and the sealing surface.

13. A method of fabricating a monolithic airflow testing mold of claim 1 suitable for mating with a workpiece, the method comprising:
   depositing a first material having a first Shore A hardness onto a build substrate to form a platform portion;
   depositing a second material having a second Shore A hardness within the platform portion to form a workpiece mating portion; and
   depositing a third material having a third Shore A hardness onto the mating portion to form a sealing surface;
   wherein the first Shore A hardness is greater than at least one of the second and third Shore A hardnesses by at least 10 Shore A points.

14. The method of claim 13 and further comprising: depositing a fourth material having a fourth Shore D hardness within the mating portion.

15. The method of claim 14, wherein the fourth Shore D hardness is greater than the first Shore A hardness.

16. The method of claim 15, wherein each of the first through fourth materials are formed from a polymer-based thermoplastic.

17. The method of claim 16, wherein the polymer-based thermoplastic is formed from a material selected from the group consisting of acrylonitrile butadiene styrene, polycarbonates, acrylonitrile styrene acrylate, nylons, and combinations thereof.

18. The method of claim 13, wherein the depositing steps are carried out using an additive manufacturing process.

19. The method of claim 13 and further comprising: shaping the mating portion to complement a workpiece geometry.

* * * * *